(12) United States Patent  (10) Patent No.: US 8,899,030 B2
Harrison  (45) Date of Patent: Dec. 2, 2014

(54) METHOD OF USING A PUMP POSITION SENSOR FOR AN EBS PUMP CHECK

(75) Inventor: Christopher Allen Harrison, Shelby Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 511 days.

(21) Appl. No.: 13/324,230

(22) Filed: Dec. 13, 2011

(65) Prior Publication Data

US 2013/0145752 A1  Jun. 13, 2013

(51) Int. Cl.
 *B60T 17/22* (2006.01)
(52) U.S. Cl.
 USPC ............ 60/327; 60/545; 60/403; 303/3
(58) Field of Classification Search
 CPC .................... B60T 17/22; B60T 2270/406
 USPC ............ 60/327, 403, 405, 545; 303/3, 122
 See application file for complete search history.

(56) References Cited

U.S. PATENT DOCUMENTS 4,845,463 A * 7/1989 Didier et al. ............. 188/1.11 E
8,201,896 B2 * 6/2012 Ishizuka ............................ 303/3

FOREIGN PATENT DOCUMENTS

DE  102011007509 A1  10/2012
EP  1826083 A1  8/2007

OTHER PUBLICATIONS

Patent Cooperation Treaty PCT International Search Report, PCT/US212/069366, May 2013.

* cited by examiner

*Primary Examiner* — Thomas E Lazo

(57) ABSTRACT

A method of performing a pump check for a brake system comprises determining a first position of a pump with a pump position sensor upon ignition of a vehicle. A pump motor is powered based upon a preselected operating condition. A second position of the pump is determined with the pump position sensor. The first position of the pump and the second position of the pump are compared. The pump motor is confirmed as operational when the second position of the pump is different from the first position of the pump.

7 Claims, 2 Drawing Sheets

METHOD OF USING A PUMP POSITION SENSOR FOR AN EBS PUMP CHECK

TECHNICAL FIELD

The present disclosure relates to automotive vehicles and more particularly to electronic brake systems for automotive vehicles.

BACKGROUND

An electronic brake system (EBS) utilizes a hydraulic control unit (HCU) to perform various functions within the brake system. The Federal Motor Vehicle Safety Standards (FMVSS) and the Economic Commission of Europe (ECE) standards require various safety requirements be fulfilled to ensure proper functionality of the EBS. One such standard is a required check by the HCU every ignition cycle that a pump motor for the EBS is operational.

To perform the pump check the HCU applies current to the motor for a period of time, stops the application of current to the motor, then measures the voltage generated by the motor as it continues to rotate, i.e. acts as a generator when current is no longer being applied. As such, the motor must reach sufficient speed to generate measureable voltage when no longer receiving power from the HCU. Measureable voltage requires that the output from the pump motor be of a sufficient level and a sufficient duration that the HCU can obtain the data.

However, in order to reach rotational speed and duration sufficient to generate measureable voltage the pump motor creates undesirable NVH that can be heard or felt from within the passenger compartment of the vehicle. Various methods of masking the NVH created by the pump check are used to minimize the passengers notice.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of operating a brake system comprises determining if the system is functional, of which part is to determine a first position of a pump with a pump position sensor upon ignition of a vehicle. A pump motor is powered based upon a preselected operating condition. A second position of the pump is determined with the pump position sensor. The first position of the pump and the second position of the pump are compared. The pump motor is confirmed as operational when the second position of the pump is different from the first position of the pump.

A method of performing a pump check for an electronic brake system for a vehicle comprises determining a first position of a pump with a pump position sensor upon ignition of a vehicle and prior to reaching a preselected vehicle speed. A pump motor is powered for a predetermined time and at a predetermined current. A second position of the pump is determined with the pump position sensor after the predetermined time and current have been applied to the pump motor. The first position of the pump and the second position of the pump are compared. A confirmation signal is sent that the pump motor is operational when the second position of the pump is different from the first position of the pump and a fault signal is sent when the first position and the second position of the pump are the same.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
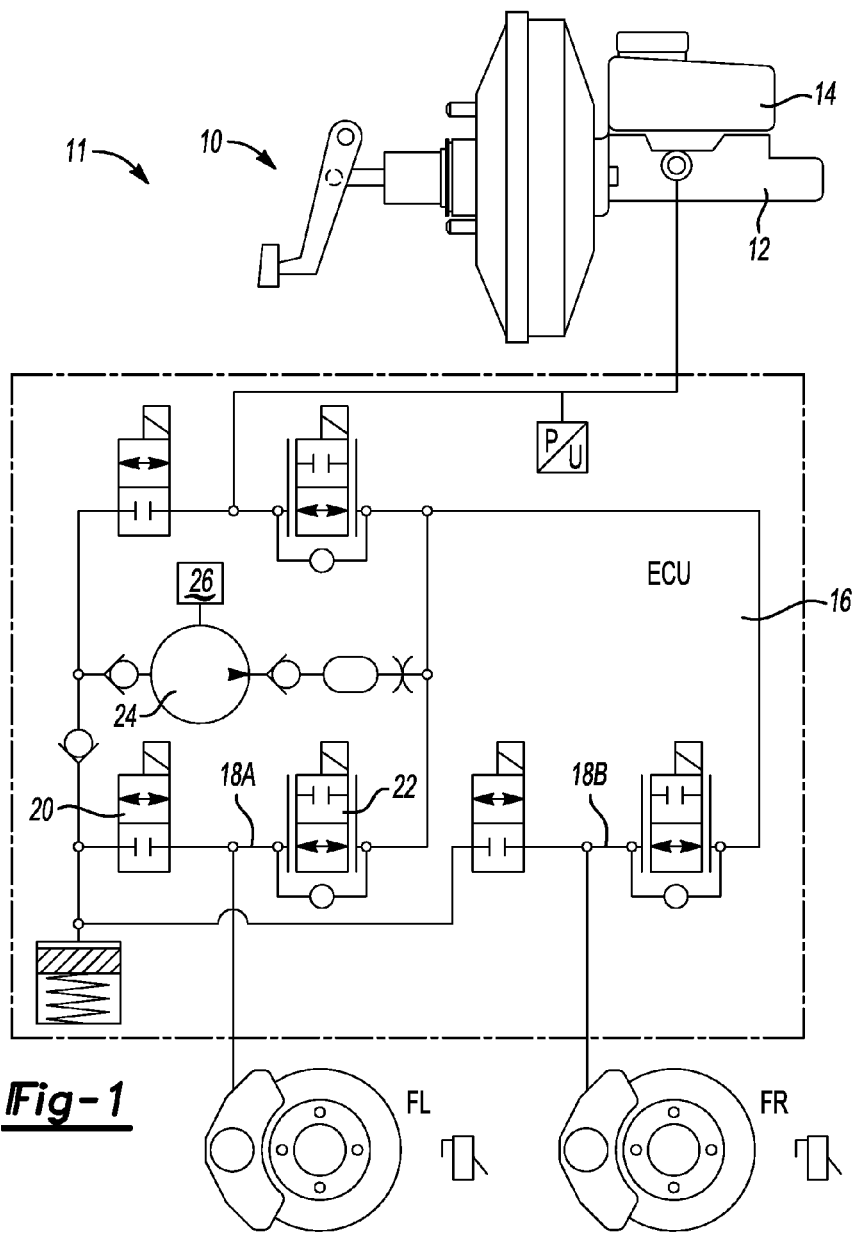
FIG. 1 is a schematic partial illustration of an electronic brake system of the present invention.

The following description is merely exemplary in nature and is in no way intended to limit the disclosure, its application, or uses. For purposes of clarity, the same reference numbers will be used in the drawings to identify similar elements. FIG. 1 shows a partial schematic illustration of a vehicle brake system 10 for a motor vehicle 11. The brake system 10 has a pedal-actuated tandem master brake cylinder 12 with a brake fluid reservoir 14. An electronic control unit (ECU) 16 comprises a microcontroller system by means of which the actuators and sensors comprised in the brake system 10 are electronically controlled and measurements are performed. The brake system 10 comprises two brake circuits (only one shown). Furthermore, each brake circuit comprises two wheel pressure circuits (18A, 18B shown) with respectively one analog controllable normally closed valve 20 and a normally open valve 22, which can also be actuated by ECU 16 using PWM current control. A pump 24 is used for independent pressure buildup within the brake system 10, for example, in a case of TCS or ESP. A pump motor 26 provides power to the pump 24

Figure 2:
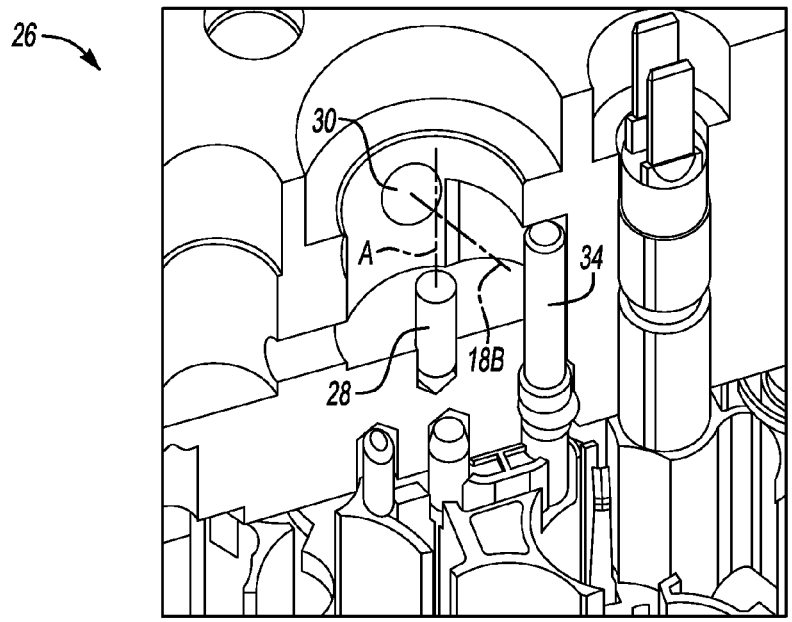
FIG. 2 is a partial cross-sectional illustration of a pump motor for the electronic brake system of FIG. 1.
Figure 4:
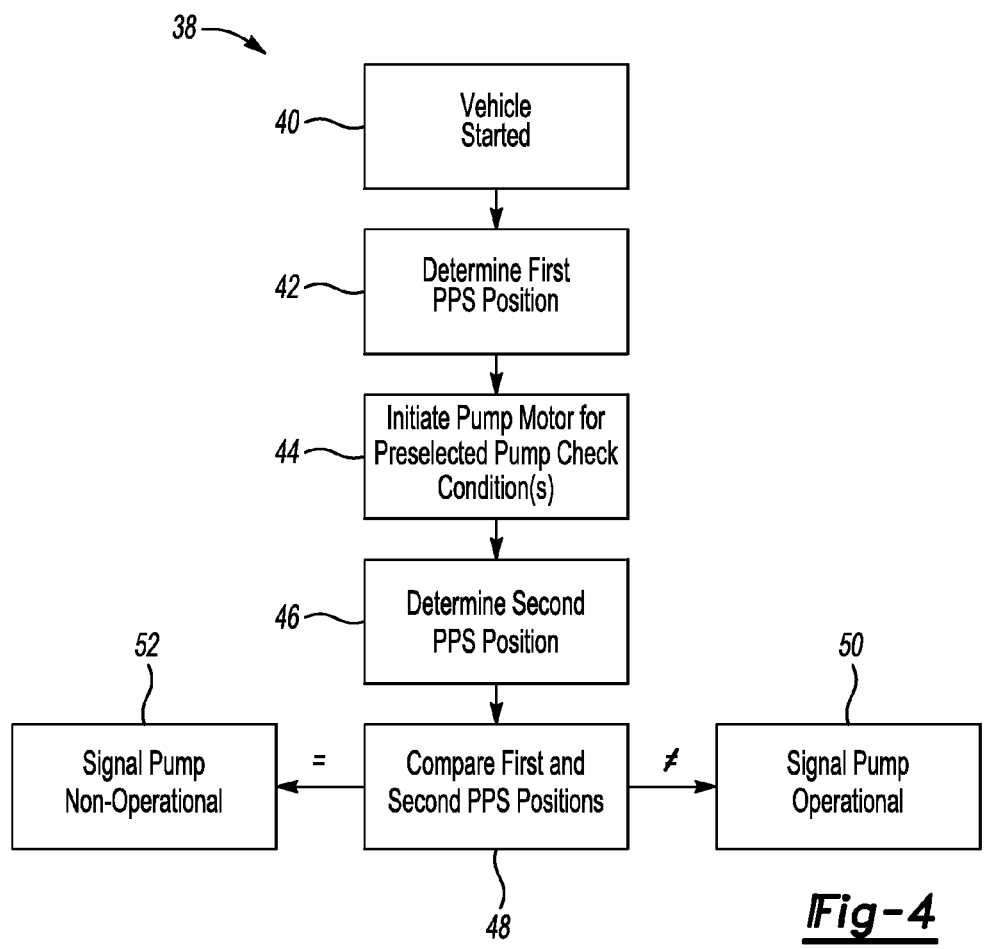
FIG. 4 is a schematic illustration of a method of performing a pump check for the pump motor of the electronic brake system of FIGS. 1-3.

FIG. 2 shows a partial cross-sectional view of the pump 24 and pump motor 26. The pump motor 26 rotates an output shaft 28 which drives rotation of a bearing 32 (shown in FIG. 3) about a first axis A. The eccentric rotation of the bearing 28 moves a piston 30 within a cylinder defined by the pump 22, along a second axis B, that is perpendicular to the first axis A to build pressure using the pump 22.

Figure 3:
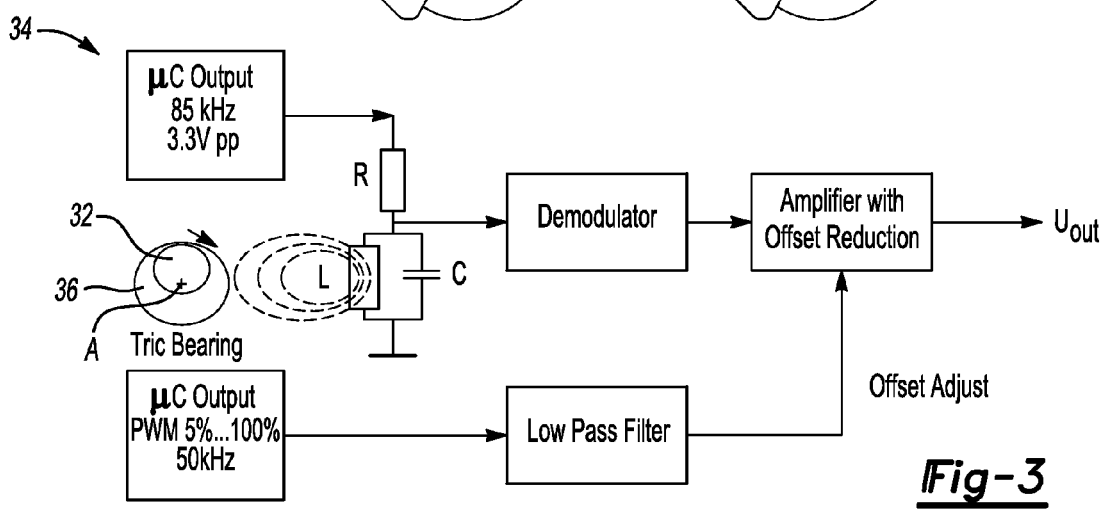
FIG. 3 is a schematic illustration of a pump position sensor for the pump motor of the electronic brake system of FIGS. 1 and 2.

FIG. 3 illustrates one embodiment of a pump position sensor (PPS) 34 for use with the pump 24. In the embodiment shown, the pump position sensor 34 measures the rotational position of the bearing 32 as the pump motor 26 rotates the bearing 32. The eccentric rotation of the bearing 32 around the first axis A results in a varying distance between the bearing 32 and the sensing component 36 of the pump position sensor 34. Knowing the distance between the bearing 32 and the sensing component 36 a position of the piston 30 within the pump 24 can be calculated. The pump position sensor 34 is used for various systems of the vehicle 11, for example adaptive cruise control.

With reference to FIGS. 1-3, FIG. 4 illustrates a method of using the pump position sensor 34 to provide a pump check for the vehicle 11, shown at 38. The method of checking the pump motor 26 is performed at an ignition of the vehicle 11, step 40. The operation of checking the pump motor 26 can be performed at standstill up to preselected vehicle speeds, e.g. prior to reaching 10 kilometers/hour. The ECU 16 determines an initial or first position of the pump 24 using the position sensor 34, step 42.

The ECU 16 then provides current to the pump motor 26 for at least one preselected pump check operating condition, step 44. The at least one preselected pump check operating condition may be a duration of time and current level sufficient to initiate rotation of the pump motor 26 or a particular rotational speed of the pump motor 26. The resulting rotational speed of the pump motor 26 may be insufficient for sustained operation of the pump 24 and may not be noticeable by a passenger of the vehicle 11, but is sufficient to cause the output shaft 28 to rotate the bearing 32 and thus move the piston 30. A rotational speed and duration required to achieve measurable voltage from the pump motor 26 are not necessary and the operating conditions for the pump check may be well below the speed required to create measureable output voltage by the pump motor 26. The preselected pump check conditions only need to be sufficient to provide some rotation to the output shaft 28 of the pump motor 26. Rotation of the output shaft 28 will correspondingly rotate the bearing 32. The power to the pump motor 26 can be stopped at the end of the preselected pump check operating conditions.

The ECU 16 then determines a second position of the pump 24 using the position sensor 34, step 46. The ECU 16 compares the first position and the second position of the pump 24, step 48. If the first position and the second position of the pump 24 are different then the pump motor 26 is functioning to rotate the bearing 32. If the first and the second position of the pump 24 are different the ECU signals that the pump motor 26 is operational, step 50. If the first position and the second position of the pump 24 are the same then the pump motor 26 is not functioning to rotate the bearing 32 and the ECU 16 sends a fault warning, step 52.

The power required to operate the pump motor 26 sufficiently to provide a measureable difference by the pump position sensor 34 is minimal in current and duration and result in only a low rotational speed for the motor 26. Minimal to no NVH will be generated and will be unnoticeable to passengers within the vehicle 11.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of operating a brake system comprising:
    determining a first position of a pump with a pump position sensor upon ignition of a vehicle;
    powering a pump motor based upon at least one preselected operating condition;
    determining a second position of the pump with the pump position sensor;
    comparing the first position of the pump and the second position of the pump; and
    confirming that the pump motor is operational when the second position of the pump is different from the first position of the pump.

2. The method of claim 1, further comprising initiating a fault indicator if the first position and the second position of the pump are the same.

3. The method of claim 1, wherein the preselected operating condition is a predetermined amount of time and a predetermined current value for powering the pump motor.

4. The method of claim 1, wherein the preselected operating condition is a predetermined rotational speed of the pump motor.

5. The method of claim 1, wherein the powering a pump motor for a preselected operating condition occurs prior to the vehicle moving above a speed of ten kilometers per hour.

6. A method of performing a pump check for an electronic brake system for a vehicle comprising:
    determining a first position of a pump with a pump position sensor upon ignition of a vehicle and prior to reaching a preselected vehicle speed;
    powering a pump motor based for a predetermined time and at a predetermined current;
    determining a second position of the pump with the pump position sensor after the predetermined time and current have been applied to the pump motor;
    comparing the second position of the pump to the first position of the pump; and
    sending one of a confirmation signal that the pump motor is operational when the second position of the pump is different from the first position of the pump and a fault signal when the first position and the second position of the pump are the same.

7. The method of claim 6, wherein the sending one of the confirmation signal and the fault signal occurs prior to the vehicle moving over a speed of ten kilometers per hour.

* * * * *